United States Patent
Schumacher

(10) Patent No.: US 8,533,247 B2
(45) Date of Patent: Sep. 10, 2013

(54) ARRANGEMENT FOR GENERATING POLY-PHASE SEQUENCES

(75) Inventor: Adrian Schumacher, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 499 days.

(21) Appl. No.: 12/867,478

(22) PCT Filed: Dec. 9, 2008

(86) PCT No.: PCT/EP2008/010439
§ 371 (c)(1),
(2), (4) Date: Aug. 12, 2010

(87) PCT Pub. No.: WO2009/100746
PCT Pub. Date: Aug. 20, 2009

(65) Prior Publication Data
US 2011/0060784 A1    Mar. 10, 2011

(30) Foreign Application Priority Data
Feb. 12, 2008   (DE) .......................... 10 2008 008 617

(51) Int. Cl.
*G06F 1/02*         (2006.01)
*H03L 7/00*         (2006.01)

(52) U.S. Cl.
USPC ............................ 708/271; 708/276; 327/163

(58) Field of Classification Search
USPC ......................... 708/271, 276; 327/379, 163
See application file for complete search history.

(56) References Cited

U.S. PATENT DOCUMENTS

| 4,333,080 | A | 6/1982 | Collins |
| 6,041,337 | A | 3/2000 | Whittaker |
| 6,553,082 | B2 | 4/2003 | Jechoux |
| 6,662,000 | B1 | 12/2003 | Belveze |
| 6,751,745 | B1 * | 6/2004 | Yoshimura et al. ........... 713/501 |
| 7,391,759 | B2 | 6/2008 | Wallace |
| 2003/0085746 | A1 * | 5/2003 | Tagami ....................... 327/255 |
| 2006/0167962 | A1 * | 7/2006 | Torosyan ..................... 708/271 |

FOREIGN PATENT DOCUMENTS

| DE | 60007930 T2 | 10/2004 |
| DE | 60116149 T2 | 9/2006 |
| DE | 69936536 T2 | 3/2008 |
| EP | 1314997 A1 | 5/2003 |

OTHER PUBLICATIONS

International Preliminary Report on Patentability, dated May 28, 2010, issued in corresponding International Application No. PCT/EP2008/010439, filed Dec. 9, 2008.
International Search Report, mailed Aug. 4, 2009, issued in corresponding International Application No. PCT/EP2008/010439, filed Dec. 9, 2008.

* cited by examiner

*Primary Examiner* — Chuong D Ngo
(74) *Attorney, Agent, or Firm* — Christensen O'Connor Johnson Kindness PLLC

(57) ABSTRACT

The electronic circuit arrangement is used for generating poly-phase sequences as synchronization sequences and/or reference sequences in radio communications systems. It comprises a first adder, a first multiplier, a first register, a second register, a first counter and a trigonometry device. The first adder adds a value ($k_m$) formed from the value (k) of the counter to the value (B) of the first register. The first multiplier multiplies the value (A) of the second register by a value (y) formed from the value (B) of the first register and the value (k) of the counter. The trigonometry device forms the real part and the imaginary part of the present value of the poly-phase sequence ($a_k$) from a value formed at least from the output value ($w_k$) of the first multiplier.

8 Claims, 3 Drawing Sheets

ARRANGEMENT FOR GENERATING POLY-PHASE SEQUENCES

FIELD OF THE DISCLOSURE

The invention relates to an arrangement, in particular, an electronic circuit arrangement for generating poly-phase sequences, in particular, as synchronisation sequences and reference sequences in radio communications systems.

BACKGROUND

Sequences of favourable correlation properties, inter alia of a low autocorrelation, are used conventionally for synchronisation in radio communications systems. Poly-phase sequences have proved very suitable in this context. Generating these sequences has hitherto been very cost-intensive, especially if it is to take place in a configurable manner. One widely used method is to keep all the required sequences in a buffer. However, this requires costly buffers and limits the flexibility of use.

Accordingly, US 2005/0128938 A1 discloses the use of poly-phase sequences for the synchronisation of OFDM signals. However, an efficient method or an efficient device for generating these sequences is not presented.

SUMMARY

The invention is based upon the object of providing an arrangement, which generates different poly-phase sequences in a flexible manner with low manufacturing costs and a fast processing speed.

This object is achieved according to the invention by the features of the independent claim 1. Advantageous further developments form the subject matter of the dependent claims relating back to this claim.

The arrangement according to the invention for generating poly-phase sequences as synchronisation sequences and/or reference sequences in radio communications systems comprises a first adder, a first multiplier, a first register, a second register, a first counter and a trigonometry device. The first adder adds a value formed from the value of the counter to the value of the first register. The first multiplier multiplies the value of the second register by a value formed from the value of the first register and the value of the counter. The trigonometry device forms the real part and the imaginary part of the present value of the poly-phase sequence from a value formed at least from the output value of the first multiplier. Accordingly, poly-phase sequences can be generated using a small number of components and therefore with low manufacturing costs. A fast processing speed can be achieved in this manner.

The electronic circuit arrangement advantageously further comprises a second multiplier. The second multiplier preferably multiplies a value formed from the value of the counter by the output of the first adder. By preference, the value formed from the first register and the value of the counter, which is multiplied by the first multiplier, is the output value of the second multiplier. In this manner, the costly squaring can be avoided. A further increase in processing speed is possible in this manner.

The output value of the first multiplier is preferably directly the input value of the trigonometry device. In this manner, the concluding step, the calculation of the real parts and imaginary parts, can be implemented without further processing steps. This achieves a fast processing speed.

In a further embodiment, the electronic circuit arrangement contains a third register, a third multiplier, a second counter and a second adder. The third multiplier preferably multiplies the value of the third register by the value of the second counter. The second adder preferably adds the negative output value of the third multiplier to the output value of the first multiplier. The output value of the second adder is preferably directly the input value of the trigonometry device. In this manner, a displacement of the poly-phase sequence in the time domain is possible. This achieves good flexibility of use.

In a further embodiment, the electronic circuit arrangement preferably further contains a second adder and a second multiplier. The first multiplier advantageously multiplies the value of the second register directly by the output value of the first adder. The second adder advantageously adds the output value of the first multiplier to a value formed from the value of the first counter. In this manner, the required number of components is further reduced, and the manufacturing cost is thus further reduced.

The electronic circuit arrangement preferably further contains a third register. The second multiplier preferably multiplies the output value of the second adder by the value of the third register. The output value of the second multiplier is preferably directly the input value of the trigonometry device. Accordingly, with this embodiment also, a time displacement of the poly-phase sequence can be achieved, and the flexibility of use can therefore be increased.

The electronic circuit arrangement preferably further contains a modulo device. The modulo device preferably forms the modulo N of the value of the first counter. The first adder preferably adds the modulo N of the value of the first counter to the value of the first register. Accordingly, arbitrary, standard counters can be used, without the need to consider the value range. This further reduces manufacturing costs.

The first counter can preferably be supplied with a start value. In this manner, given poly-phase sequences can be generated in a targeted manner. The use of random sequences is also possible through random selection of the start value of the counter.

The registers and/or the adders and/or the multipliers and/or the counters and/or the modulo device and/or the trigonometry device are advantageously realised by means of a microprocessor, an FPGA or an ASIC. Accordingly, cost-favourable standard components can be used for the manufacture. Furthermore, with the use of a programmable microprocessor, good flexibility is provided both in development and also in use.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The invention is described by way of example below with reference to the drawings, in which advantageous exemplary embodiments of the invention are presented. The drawings are as follows.

DETAILED DESCRIPTION

Figure 1:
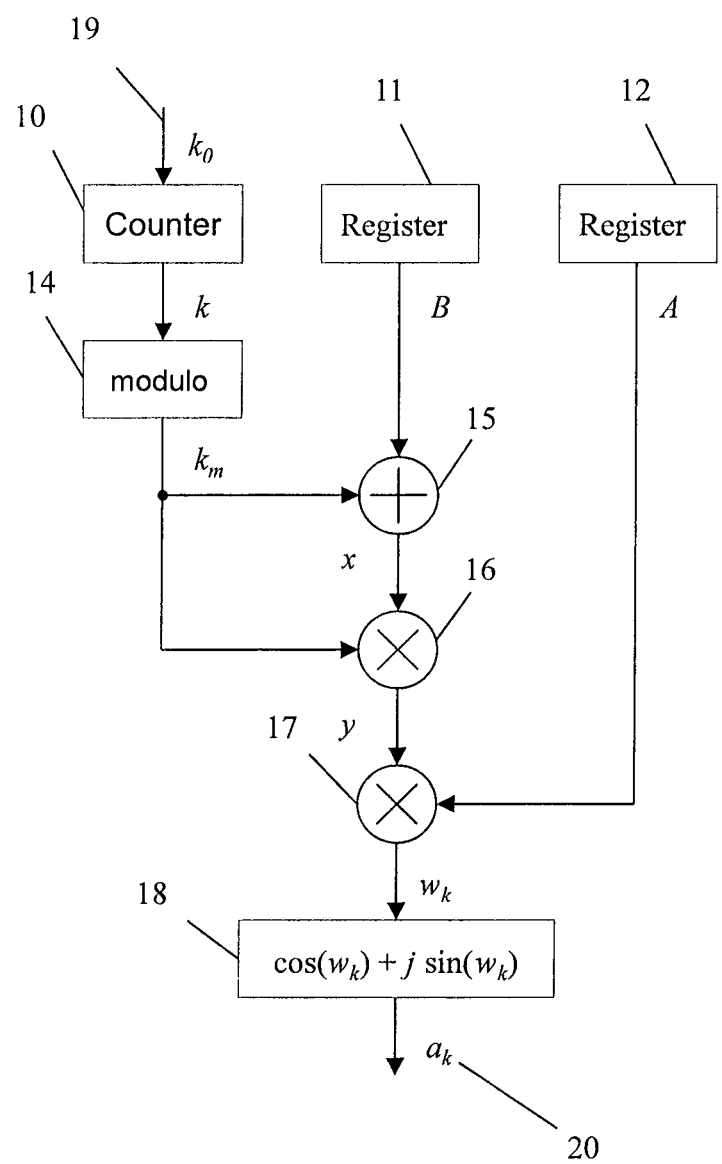
FIG. 1 shows a first exemplary embodiment of the circuit arrangement according to the invention.

Initially, the mathematical background of poly-phase sequences will be shown in general. Following this, the structure and functioning of various exemplary embodiments of the device according to the invention are explained on the basis of FIGS. 1-3. In some cases, the presentation and description of identical elements in similar drawings has not been repeated.

The mathematical background for the generation of poly-phase sequences is initially presented. The following equations (1) and (2) define the general form of poly-phase sequences for odd-numbered (1) and even-numbered (2) sequence lengths.

$$a_k = e^{-j\frac{2\pi u}{N}\left(\frac{k(k+1)}{2}+qk\right)} \quad (1)$$

$$a_k = e^{-j\frac{2\pi u}{N}\left(\frac{k^2}{2}+qk\right)} \quad (2)$$

The index k runs from 0 to N−1, N is the length of the sequences. For optimal correlation properties, the condition N=s·m² must be fulfilled. s and m are positive whole numbers. The variable u indicates the u-th root Zadoff-Chu sequence, and can be any integer number, which is relative prime to N. q is an arbitrary whole number. The two equations (1) and (2) are expressed as equation (3) by transformation:

$$a_k = e^{jAk(k+B)} \quad (3)$$

Now, in order to obtain a sequence according to equation (1), $$A = -\frac{u\pi}{N},$$

and
B=2q+1 is posited.
In order to obtain a sequence according to equation (2), $$A = -\frac{u\pi}{N},$$

and
B=2q is posited.

FIG. 1 shows a first exemplary embodiment of the device according to the invention. A counter 10 is connected to a modulo device 14. The modulo device 14 is connected to the input of an adder 15. A first register 11 is connected to the second input of the adder 15. A second register 12 is connected to a first input of a first multiplier 17. The output of the adder 15 is connected to a first input of a second multiplier 16. The modulo device 14 is connected to a second input of the second multiplier 16. The output of the second multiplier 16 is connected to an input of the first multiplier 17. The output of the first multiplier 17 is connected to a trigonometry device 18.

The counter 10 is initialised by means of a start value $k_0$ 19. The counter begins to count with the start value $k_0$ 19. Accordingly, a cyclical displacement of the sequence is possible through the selection of an appropriate start value $k_0$ 19. The current counter value k is supplied to the modulo device 14. This calculates the modulo N of the counter value k. The resulting value $k_m$ is routed to the adder 15. The adder 15 adds the value $k_m$ and the value of the first register 11. The resulting value x is multiplied via the second multiplier 16 by the output value of the modulo device 14 and routed as the value y to the first multiplier 17. This multiplies the value of the second register 12 by the value y. The result $w_k$ of the first multiplier 17 is routed to the trigonometry device 18. This determines the real part and the imaginary part, which corresponds to the "angle" $w_k$ and presents the real part and imaginary part of the current value of the poly-phase sequence. By repetition of the steps shown, the entire poly-phase sequence is generated with the correct length.

This structure avoids a cost-intensive squaring device as a part of the electronic circuit. Accordingly, a fast processing speed can be realised in spite of the low cost of manufacture.

Figure 2:
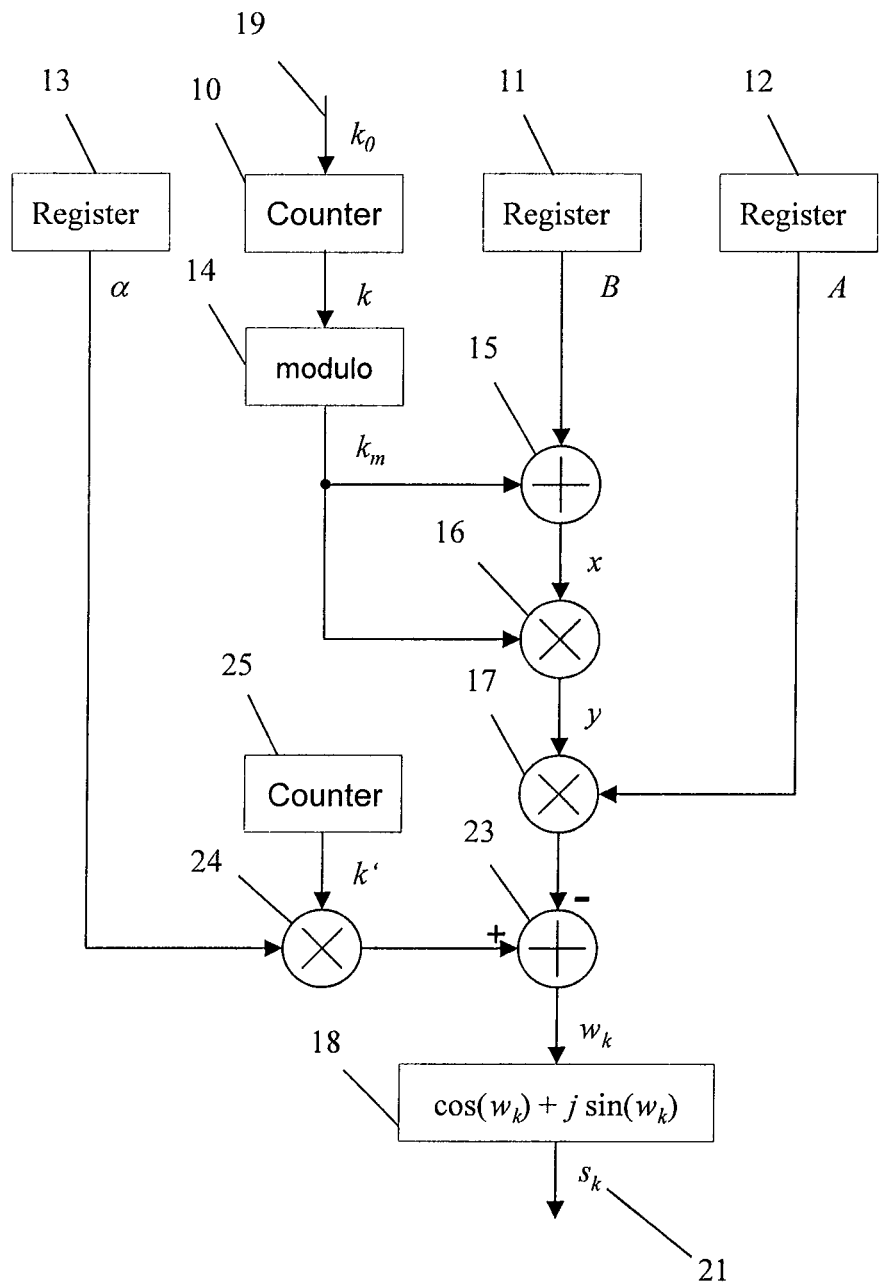
FIG. 2 shows a second exemplary embodiment of the circuit arrangement according to the invention.

FIG. 2 shows a second exemplary embodiment of the device according to the invention. The second exemplary embodiment corresponds in large part to the first exemplary embodiment. Further reference will not be made here to corresponding parts. However, in this exemplary embodiment, the output of the first multiplier 17 is not connected directly to the trigonometry device 18. Instead, the output of the first multiplier 17 is connected to the input of a second adder 23. A third register 13 is connected to an input of a third multiplier 24. A further input of the third multiplier 24 is connected to a second counter 25. The output of the third multiplier 24 is connected to a second input of the second adder 23. In this exemplary embodiment, the output of this second adder is now connected to the trigonometry device 18.

The function of the parts of this exemplary embodiment corresponding to the exemplary embodiment from FIG. 1 also corresponds to the function of the corresponding parts. Reference will be made only to the differences. The third multiplier 24 multiplies the value a of the third register 13 by the value k' of the second counter 25. The output value of the first multiplier 17 is subtracted by the second adder 23 from the output value of the third multiplier 24. The resulting value $w_k$ is routed to the trigonometry device 18. The latter determines the real part and the imaginary part, which correspond to the "angle" $w_k$ and represent the real part and the imaginary part of the current value of the poly-phase sequence. By repetition of the steps shown, the entire poly-phase sequence is generated with the desired length.

In order to achieve a displacement of the sequence in the time domain, a further multiplication by the factor $e^{j\alpha k'}$ is implemented, as shown in equation (4).

$$s_k = e^{j\alpha k'} a_k \quad (4)$$

In the exemplary embodiment, this is realised by supplying the third register with a value. Since the additional exponent j*k'*α is included before the determination of the real part and the imaginary part, a low-cost addition is sufficient. This avoids the implementation of a multiplication. The counter values k and k' in this context can be different. On the one hand, this allows great flexibility of use. On the other hand, the additional counter 25 and the additional multiplier 24 are required.

Figure 3:
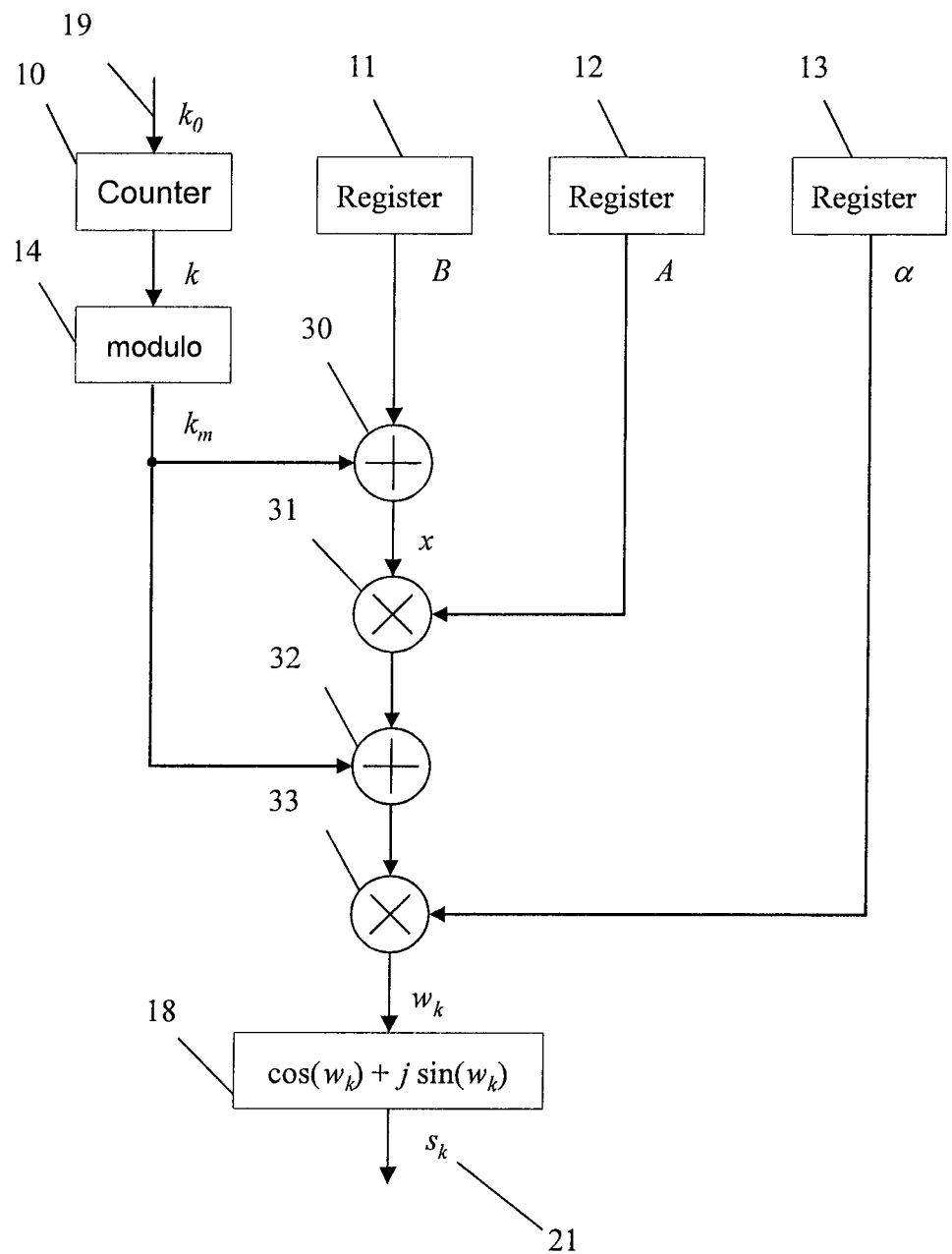
FIG. 3 shows a third exemplary embodiment of the circuit arrangement according to the invention.

FIG. 3 shows a third exemplary embodiment, in which only one counter value k is used and accordingly, a reduced complexity of the electronic circuit is achieved.

In order to reduce the complexity of the circuit further, in the case of the exemplary embodiments presented in FIGS. 1 and 2, the integer values of the counter 10 and of the second register 11 are initially added and multiplied. Only then is the multiplication by the non-integer value of the first register 12 implemented. In this manner, the length of the intermediate buffer is limited. Furthermore, the number of points to be multiplied is minimised in this manner. The third exemplary embodiment differs significantly from the first two exemplary embodiments. Accordingly, the overall structure of this exemplary embodiment is explained independently in the following section.

A counter 10 is connected to a modulo device 14. The modulo device 14 is connected to the input of a first adder 30. A first register 11 is connected to the second input of the first adder 30. A second register 12 is connected to a first input of a first multiplier 31. The output of the first adder 30 is connected to a second input of the first multiplier 31. The output of the first multiplier 31 is connected to an input of the second adder 32. The second input of the second adder 32 is also connected to the modulo device 14. The output of the second adder 32 is connected to an input of a second multiplier 33. A second input of the second multiplier 33 is connected to a third register 13. The output of the second multiplier 33 is connected to the trigonometry device 18.

The counter routes its counter a value k to the modulo device 14. Here also, the counter 10 can be supplied with a start value $k_0$ 19, in order to achieve a cyclical displacement of the sequence. The modulo device 14 reroutes its output value $k_m$ to a first input of the first adder 30. The value B of the second register 11 is routed to a further input of the first adder 30. The first adder 30 routes its output value x to a first input of the first multiplier 31. The first register 12 passes its value A to a second input of the first multiplier 31. The output value of the first multiplier 31 is routed to a first input of the second adder 32. The output value $k_m$ of the modulo device 14 is routed to a second input of the second adder 32. The output of the second adder 32 is used as the input into a first input of the second multiplier 33. The value of the third register 13 is transmitted to a second input of the second multiplier 33. The output value $w_k$ of the second multiplier 33 is transmitted directly to the trigonometry device 18. The latter determines from this the real part and the imaginary part of the poly-phase sequence 21 $s_k$.

In this exemplary embodiment, the factor $e^{j\alpha k}$, as shown in equation (5), is multiplied, in order to achieve a displacement in the time domain.

$$s_k = e^{j\alpha k} a_k \quad (5)$$

Since only one counter is set, this results in a reduced flexibility of use. However, the complexity of the circuit is significantly reduced. Accordingly, it is possible to dispense with a third multiplier and a second counter.

Moreover, with all of the exemplary embodiments, a further modulation of the poly-phase sequences $a_k$ or $s_k$ with complex numbers with the absolute value 1 is possible. This modulation is implemented on the output signal of the poly-phase generator shown.

The invention is not restricted to the exemplary embodiments illustrated. Accordingly, an implementation purely in software is also conceivable. An implementation by means of discrete hardware components is also possible. Moreover, a subdivision of the circuit over several of the implementation options described is also a possibility. All of the features described above or illustrated in the drawings can be combined with one another as required within the framework of the invention.

The invention claimed is:

1. An electronic circuit for generating poly-phase sequences, comprising: a first adder, a first multiplier, a first register, a second register, a first counter, a modulo device, and a trigonometry device,
   wherein the first adder adds a value ($k_m$) formed from the value of the first counter to the value (B) of the first register,
   wherein the first multiplier multiplies the value (A) of the second register by a value (y) formed from the value (B) of the first register and the value (k) of the first counter,
   wherein the trigonometry device forms the real part and the imaginary part of the present value ($a_k$, $s_k$) of the poly-phase sequence from a value ($w_k$) formed at least from the output value of the first multiplier,
   wherein the modulo device forms of the modulo N ($k_m$) of the value (k) of the first counter, and
   wherein the first adder adds the modulo N ($k_m$) of the value (k) of the first counter to the value (B) of the first register.

2. The electronic circuit according to claim 1, further comprising:
   a second multiplier, wherein
   the second multiplier multiplies a value ($k_m$) formed from the value of the counter by the output of the first adder, and
   the value (y) formed from the value (B) of the first register and the value (k) of the first counter is the output value (y) of the second multiplier.

3. The electronic circuit according to claim 2, wherein the output value ($w_k$) of the first multiplier is directly the input value of the trigonometry device.

4. The electronic circuit according to claim 2, further comprising:
   a third register, a third multiplier, a second counter and a second adder, wherein
   the third multiplier multiplies the value ($\alpha$) of the third register by the value (k') of the second counter,
   the second adder subtracts the output value of the first multiplier from the output value of the third multiplier, and
   the output value ($w_k$) of the second adder is directly the input value of the trigonometry device.

5. The electronic circuit according to claim 1, further comprising:
   a second adder and a second multiplier, wherein
   the first multiplier multiplies the value (A) of the second register directly by the output value of the first adder,
   the second adder adds the output value of the first multiplier to a value ($k_m$) formed from the value of the first counter.

6. The electronic circuit according to claim 5, further comprising:
   a third register, wherein
   the second multiplier multiplies the output value of the second adder by the value ($\alpha$) of the third register, and
   the output value ($w_k$) of the second multiplier is directly the input value of the trigonometry device.

7. The electronic circuit according to claim 1, wherein the first counter can be supplied with a start value ($k_0$).

8. The electronic circuit according to claim 1, wherein the registers and/or the adder and/or the first multiplier and/or the first counter and/or the modulo device and/or the trigonometry device are realized by a microprocessor, an FPGA or an ASIC.

* * * * *